July 16, 1968 J. W. KIRKPATRICK 3,393,101

THERMOCOUPLE PROBE WITH PLURAL JUNCTIONS

Filed June 29, 1965

INVENTOR.
John W. Kirkpatrick
BY
Paul Fitzpatrick
ATTORNEY

United States Patent Office 3,393,101
Patented July 16, 1968

3,393,101
THERMOCOUPLE PROBE WITH PLURAL JUNCTIONS
John W. Kirkpatrick, Indianapolis, Ind., assignor to General Motors Corporation, Detroit, Mich., a corporation of Delaware
Filed June 29, 1965, Ser. No. 467,956
3 Claims. (Cl. 136—224)

This invention relates to gas probes, and particularly to a probe adapted for measuring the temperature distribution in a gas flow.

More specifically, this invention relates to a thermocouple-type temperature sensing probe which is adapted to project into a flowing gas stream and to measure the gas temperature at various depths according to the length of the probe and the number of thermocouple junctions. The probe has a head portion incorporating electrical contact terminals and a hollow tube made of one thermocouple material and extending into the gas flow. A plurality of conductors of a second thermocouple material are arranged within the hollow tube and connected to it at various points along its length to form thermocouple junctions with it. Between the thermocouple junctions thus formed the tube incorporates suitable cuts, slots, or other discontinuities to allow gas flow through the tube and to minimize heat conduction from one junction to another. Thus, the slots serve to insulate one thermocouple junction from another.

Thus, it is the object of the subject invention to provide a temperature sensitive thermocouple probe which is adapted to be positioned in a gas stream to sense and indicate the temperature distribution through such a gas flow. To achieve this result, the subject probe has been designed to be of a minimum diameter so as to be readily insertable through small openings in a gas duct and to thereby result in minimum interference with the gas flow pattern through the duct. Most of the previous such thermocouple devices have been relatively bulky, thereby interfering with and distorting the gas flow through the duct so as to result in inaccurate values of the temperature distribution in such a gas flow.

Other objects, features, and advantages of the subject invention will become obvious upon reference to the following detailed description and the drawings depicting the preferred embodiment thereof, wherein.

Figure 1:
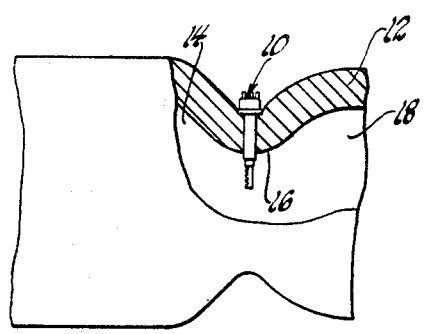
FIGURE 1 is a schematic view with parts broken away of the subject probe as used to measure the temperature distribution in a gas flow through a nozzle.
Figure 3:
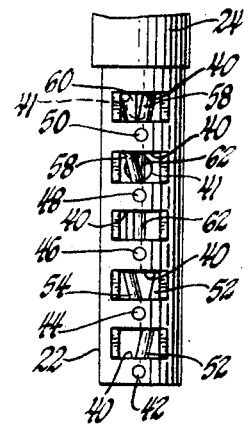
FIGURE 3 is a front view of the probe.

More particularly, FIGURE 1 shows the subject temperature probe 10 as used to measure the temperatures of a gas flow through a nozzle 12. This particular nozzle 12 has a converging inlet portion 14, a throat portion 16, and a diverging exit portion 18. The probe 12 is inserted through the wall of the nozzle 12 so that one of its ends extends into the gas stream, flowing through the nozzle. The probe 10 may be secured to the nozzle 12 by any suitable means such as slotted ear portion, on plate 26 adapted to be bolted to the nozzle.

Figure 2:
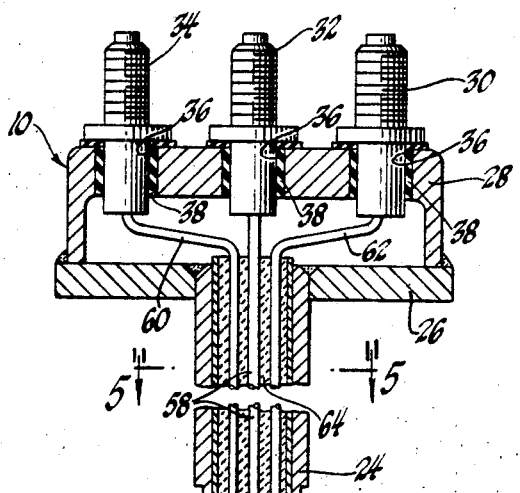
FIGURE 2 is an enlarged sectional view of the temperature measuring probe.
Figure 4:
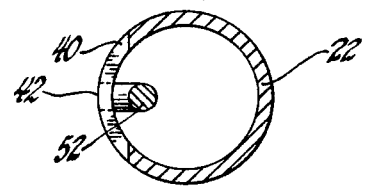
FIGURE 4 is a sectional view of the probe taken in the direction of arrows 4—4 in FIGURE 2.
Figure 5:
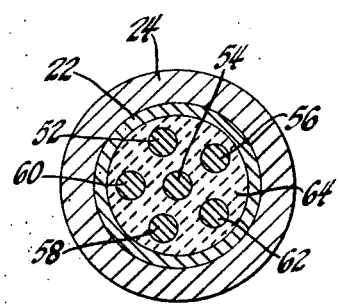
FIGURE 5 is a sectional view of the probe as taken in the direction of arrows 5—5 in FIGURE 2.

The details of the probe 10 can best be seen by looking at the enlarged view in FIGURE 2. The probe 10 features a platinum-rhodium tube 22, which serves as one material in the thermocouple junctions. The tube 22 is housed within a sheath 24 which, in turn, is welded to an annular head 26. The annular head 26 has attached thereto a terminal mounting portion 28 which receives six contact terminals, three of which (30, 32, and 34) are shown in FIGURE 2.

The terminals 30, 32 and 34 are inserted in bores 36 in the upper surface of the terminal mounting portion 28 and are secured therein by means of a cement material 38. The terminals 30, 32, 34 may be of any suitable type such that standard electrical contacts may be threaded or clamped to them to result in good electrical connection. It is suggested that the sheath 24, the annular head 26, and the terminal mounting portion 28 be comprised of a material such as Hastelloy X, which is chosen because of its temperature and electrical conduction properties. It is also suggested that the tube 22 be welded to the sheath 24.

The tube 22 is constructed so as to have a plurality of slots or openings 40 cut through a portion of its circumference and spaced along its length and a pair of openings 41 are cut through the diametrically opposite side. The inserted end of the hollow tube 22 is open to cooperate with openings 40 and 41 to provide for the free flow of gas into and through the hollow tube 22. The bridge portions 42, 44, 46, 48 and 50 of the tube 22 remaining between the openings 40 are then used as the locations for the thermocouple junctions. The openings 40 also serve to insulate each of the thermocouple junctions from the others by eliminating direct heat conduction between them. Thermocouple lead wires 52, 54, 56, 58 and 60, formed of platinum wire, are fixed to the tube 22 by fusion welding at the locations 42, 44, 46, 48 and 50 respectively to form thermocouple junctions at each of these points. Hence, each thermocouple junction is comprised of the platinum wire in contact with the platinum-rhodium tube 22. The five thermocouple lead wires 52, 54, 56, 58, 60, extend through the tube 22 and are connected to five of the six electrical contact terminals. A sixth lead wire 62, comprised of platinum-rhodium, as is the tube 22, connects the tube and the sixth terminal. All six of these wires pass through a cement insulation substance 64 at the upper portion of the tube 22. This cement insulation 64 serves the purpose of securing the wires in position relative to one another, and it further insulates the head portion and terminals from the heat of the gas stream pouring into the lower portion of the hollow tube 22.

Thus, a gas probe is provided which incorporates thermocouple junctions at five points along its length and which can measure the relative temperatures at these five points so as to give information regarding the temperature distribution in a gas stream. To obtain this information a voltmeter or other suitable instrument (not shown) is connected to the terminal 30 which corresponds to the wire 62 connected to the tube 22 and to the terminal which corresponds to the thermocouple lead wire connected to the one of the five locations at which the temperature is desired.

To get the temperatures in the other thermocouple junctions the voltmeter is again connected to the terminal 30 for the wire 62 and to the terminal for the thermocouple wire leading to the particular junction desired. When all five values have been determined, they can be compared directly since they all have a common base junction at the voltmeter, and this information can be used for the purpose of determining the temperature distribution through the gas stream. The absolute temperatures at each of these junctions can be determined by knowing the temperature at the base junction and by knowing the voltage potential produced by a temperature difference across a platinum and platinum-rhodium thermocouple.

Thus, the subject invention presents a device by which the temperature at multiple points in a gas stream can be measured and compared. It further provides such a device in an instrument which has a significantly small diameter so that it can be inserted through small openings in the structure surrounding the gas flow and further does not interfere with the normal gas flow so as to distort the true values of the temperature in the flow. It should be clear that although the subject probe has been shown with five thermocouple junctions the number can be increased or decreased according to the desired situation and the space limitations within the probe. It should also be clear that such a probe is not limited to use in a nozzle, but that it may be used in any situation where the temperature characteristic at various points in a gas stream are desired. Further, it should be noted that other thermocouple material combinations can be used as long as they can withstand the temperatures existing in the particular gas stream being tested. The platinum and platinum-rhodium combination was selected in this embodiment because its characteristics were suitable for this application.

Although but one embodiment of the subject invention has been shown and described in detail, it should be clear to those skilled in the art to which it pertains that any changes and modifications may be made thereto without departing from the scope of the invention.

I claim:
1. A probe adapted to be inserted into a gas stream to measure the temperature at various points in said gas stream, said probe comprising:
   a head including a plurality of electrical contact terminals;
   a hollow tube having one end secured to said head portion and its other end adapted to extend into said gas stream, said tube having a plurality of slots through a portion of its circumference and spaced along its length defining discrete bridge portions of the tube between said slots and allowing the gas from said gas stream to flow into and through said tube;
   a plurality of conductor wires within said tube joined at one end to said respective bridge portions to form thermocouple junctions with said tube at points along the length of said tube and connected at the other end with said contact terminals, said wires being formed of a material other than the material of said tube;
   and a connector wire of the same material as said tube, fixed at one end to said tube and to one of said plurality of electrical contacts at its other end.

2. A probe as set forth in claim 1 wherein said tube has openings on the opposite diametrical side from said plurality of slots to facilitate the flow of gas through said tube.

3. A probe as set forth in claim 2 wherein the other end of said hollow tube is open to cooperate with said openings and slots to facilitate the flow of gas through said tube.

References Cited
UNITED STATES PATENTS

| | | | |
|---|---|---|---|
| 2,279,043 | 4/1942 | Harrington | 136—224 X |
| 2,614,429 | 10/1952 | Welsh et al. | 136—230 X |
| 2,496,806 | 2/1950 | Moffatt | 136—224 |
| 2,930,827 | 3/1960 | Schunke | 136—224 |

ALLEN B. CURTIS, *Primary Examiner.*